United States Patent
Chung

(12) 
(10) Patent No.: US 6,434,671 B2
(45) Date of Patent: Aug. 13, 2002

(54) SOFTWARE-CONTROLLED CACHE MEMORY COMPARTMENTALIZATION

(75) Inventor: Shine Chung, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/940,865

(22) Filed: Sep. 30, 1997

(51) Int. Cl.[7] .............................................. G06F 12/00
(52) U.S. Cl. ...................... 711/129; 711/128; 711/133; 711/136; 711/3
(58) Field of Search .................. 711/128, 129, 711/133, 3, 213, 159, 160, 136; 365/49

(56) References Cited

U.S. PATENT DOCUMENTS

| | | | | |
|---|---|---|---|---|
| 4,195,342 A | * | 3/1980 | Joyce et al. ................. | 710/101 |
| 4,315,312 A | * | 2/1982 | Schmidt ...................... | 711/172 |
| 4,853,846 A | * | 8/1989 | Johnson et al. ............. | 710/101 |
| 5,014,195 A | * | 5/1991 | Farrell et al. ................ | 711/128 |
| 5,226,147 A | * | 7/1993 | Fujishima et al. .......... | 711/118 |
| 5,517,633 A | * | 5/1996 | Ohta et al. .................. | 711/146 |
| 5,553,262 A | * | 9/1996 | Ishida et al. ................. | 711/123 |
| 5,724,547 A | * | 3/1998 | Iyengar et al. .............. | 711/128 |
| 5,732,242 A | * | 3/1998 | Mowry ........................ | 711/136 |
| 5,761,715 A | * | 6/1998 | Takahashi .................... | 711/128 |
| 5,778,428 A | * | 7/1998 | Batson et al. ................ | 711/128 |
| 5,831,889 A | * | 11/1998 | Higaki ......................... | 365/49 |
| 5,835,948 A | * | 11/1998 | Olarig et al. ................ | 711/128 |
| 5,946,710 A | * | 8/1999 | Bauman et al. ............. | 711/129 |
| 6,026,470 A | * | 2/2000 | Arimilli et al. ............. | 711/128 |

OTHER PUBLICATIONS

"Computer Organization & Design The Hardware/Software Interface", David Patterson, et al., 1994, pp. 457–481 & Table of Contents.

* cited by examiner

*Primary Examiner*—Hong Kim
(74) *Attorney, Agent, or Firm*—Blakely, Sokoloff, Taylor & Zafman LLP

(57) ABSTRACT

A method and apparatus for controlling compartmentalization of a cache memory. A cache memory including a plurality of storage components receives one or more externally generated cache compartment signals. Based on the one or more cache compartment signals, cache compartment logic in the cache memory selects one of the plurality of storage compartments to store data after a cache miss.

19 Claims, 13 Drawing Sheets

| CE | CS$_1$ | CS$_0$ | LCode$_3$ | LCode$_2$ | LCode$_1$ | LCode$_0$ | WU$_3$ | WU$_2$ | WU$_1$ | WU$_0$ |
|---|---|---|---|---|---|---|---|---|---|---|
| 0 | X | X | X | X | X | 1 | 0 | 0 | 0 | 1 |
| 0 | X | X | X | X | 1 | 0 | 0 | 0 | 1 | 0 |
| 0 | X | X | X | 1 | 0 | 0 | 0 | 1 | 0 | 0 |
| 0 | X | X | 1 | 0 | 0 | 0 | 1 | 0 | 0 | 0 |
| 1 | 0 | 0 | X | X | X | X | 0 | 0 | 0 | 1 |
| 1 | 0 | 1 | X | X | X | X | 0 | 0 | 1 | 0 |
| 1 | 1 | 0 | X | X | X | X | 0 | 1 | 0 | 0 |
| 1 | 1 | 1 | X | X | X | X | 1 | 0 | 0 | 0 |

FIG. 3

| Instruction | Indicated Operation | Result |
|---|---|---|
| Out R0, 00 | R0 <- 00 (Nop) | Compartment = WAY0 (CE=1, $CS_1$=0, $CS_0$=0) |
| Out R0, 01 | R0 <- 01 (Nop) | Compartment = WAY1 (CE=1, $CS_1$=0, $CS_0$=1) |
| Out R0, 02 | R0 <- 02 (Nop) | Compartment = WAY2 (CE=1, $CS_1$=1, $CS_0$=0) |
| Out R0, 03 | R0 <- 03 (Nop) | Compartment = WAY3 (CE=1, $CS_1$=1, $CS_0$=1) |
| Out R0, 04 | R0 <- 04 (Nop) | Compartmentalization Off (CE=0, $CS_1$=X, $CS_0$=X) |

| Row | CO1 | CO0 | CS1 | CS0 | LCode3 | LCode2 | LCode1 | LCode0 | WU3 | WU2 | WU1 | WU0 |
|---|---|---|---|---|---|---|---|---|---|---|---|---|
| 1 | 0 | 0 | 0 | 0 | x | x | x | x | 0 | 0 | 0 | 1 |
| 2 | 0 | 0 | 0 | 1 | x | x | x | x | 0 | 0 | 1 | 0 |
| 3 | 0 | 0 | 1 | 0 | x | x | x | x | 0 | 1 | 0 | 0 |
| 4 | 0 | 0 | 1 | 1 | x | x | x | x | 1 | 0 | 0 | 0 |
| 5 | 0 | 1 | 0 | 0 | x | x | x | x | 0 | 0 | 0 | 1 |
| 6 | 0 | 1 | 0 | 1 | x | x | x | x | 0 | 0 | 1 | 0 |
| 7 | 0 | 1 | 1 | 0 | x | x | 0 | x | 0 | 1 | 0 | 0 |
| 8 | 0 | 1 | 1 | 1 | 1 | x | x | x | 1 | 0 | 0 | 0 |
| 9 | 0 | 1 | 1 | 1 | x | 1 | x | 1 | 0 | 0 | 0 | 1 |
| 10 | 0 | 1 | 1 | 1 | x | 0 | 1 | 0 | 0 | 0 | 1 | 0 |
| 11 | 0 | 1 | 1 | 1 | x | 0 | 0 | 0 | 0 | 1 | 0 | 0 |
| 12 | 0 | 1 | 1 | 1 | 1 | 0 | 0 | 0 | 1 | 0 | 0 | 0 |
| 13 | 1 | 0 | 0 | 0 | x | x | x | x | 0 | 0 | 0 | 1 |
| 14 | 1 | 0 | 0 | 1 | 0 | x | 0 | x | 0 | 0 | 1 | 0 |
| 15 | 1 | 0 | 1 | 0 | x | 1 | 1 | 0 | 0 | 1 | 0 | 0 |
| 16 | 1 | 0 | 1 | 1 | 1 | 0 | 0 | 1 | 1 | 0 | 0 | 0 |
| 17 | 1 | 0 | x | x | x | x | x | 1 | 0 | 0 | 0 | 1 |
| 18 | 1 | 0 | x | x | x | x | 1 | 0 | 0 | 0 | 1 | 0 |
| 19 | 1 | 0 | x | x | x | 1 | 0 | 0 | 0 | 1 | 0 | 0 |
| 20 | 1 | 0 | x | x | 1 | 0 | 0 | 0 | 1 | 0 | 0 | 0 |
| 21 | 1 | 1 | 0 | 0 | x | x | x | x | 0 | 0 | 0 | 1 |
| 22 | 1 | 1 | 0 | 0 | x | 0 | 1 | x | 0 | 0 | 1 | 0 |
| 23 | 1 | 1 | 1 | 0 | 0 | x | x | x | 0 | 1 | 0 | 0 |
| 24 | 1 | 1 | 0 | 1 | 1 | 0 | x | x | 0 | 0 | 0 | 1 |

36

| Instruction | Indicated Operation | Result |
|---|---|---|
| | | Compartment Pattern 0 ($CO_1=0$, $CO_0=0$) |
| Out R0, 00 | R0 <- 00 (Nop) | Compartment = WAY0 ($CO_1=0$, $CO_0=0$, $CS_1=0$, $CS_0=0$) |
| Out R0, 01 | R0 <- 01 (Nop) | Compartment = WAY1 ($CO_1=0$, $CO_0=0$, $CS_1=0$, $CS_0=1$) |
| Out R0, 02 | R0 <- 02 (Nop) | Compartment = WAY2 ($CO_1=0$, $CO_0=0$, $CS_1=1$, $CS_0=0$) |
| Out R0, 03 | R0 <- 03 (Nop) | Compartment = WAY3 ($CO_1=0$, $CO_0=0$, $CS_1=1$, $CS_0=1$) |
| | | Compartment Pattern 1 ($CO_1=0$, $CO_0=1$) |
| Out R0, 04 | R0 <- 04 (Nop) | Compartment = WAY0 ($CO_1=0$, $CO_0=1$, $CS_1=0$, $CS_0=0$) |
| Out R0, 05 | R0 <- 05 (Nop) | Compartment = WAY1 ($CO_1=0$, $CO_0=1$, $CS_1=0$, $CS_0=1$) |
| Out R0, 06 | R0 <- 06 (Nop) | Compartment = WAY2,3 ($CO_1=0$, $CO_0=1$, $CS_1=1$, $CS_0=0$) |
| | | Compartment Pattern 2 ($CO_1=1$, $CO_0=0$) |
| Out R0, 07 | R0 <- 07 (Nop) | Compartment = WAY0 ($CO_1=1$, $CO_0=0$, $CS_1=0$, $CS_0=0$) |
| Out R0, 08 | R0 <- 08 (Nop) | Compartment = WAY1,2,3 ($CO_1=1$, $CO_0=0$, $CS_1=0$, $CS_0=1$) |
| | | Compartment Pattern 3 ($CO_1=1$, $CO_0=1$) |
| Out R0, 09 | R0 <- 09 (Nop) | Compartment = WAY0,1 ($CO_1=1$, $CO_0=1$, $CS_1=0$, $CS_0=0$) |
| Out R0, 0A | R0 <- 0A (Nop) | Compartment = WAY2,3 ($CO_1=1$, $CO_0=1$, $CS_1=0$, $CS_0=1$) |
| | | Compartmentalization Off |
| Out R0, 0B | R0 <- 0B (Nop) | Compartmentalization Off ($CO_1=1$, $CO_0=1$, $CS_1=1$, $CS_0=1$) |

FIG. 8

SOFTWARE-CONTROLLED CACHE MEMORY COMPARTMENTALIZATION

FIELD OF THE INVENTION

The present invention relates to the field of data storage, and more particularly to a method and apparatus for storing data in a cache memory.

BACKGROUND OF THE INVENTION

Cache memories are relatively small, high-speed memories used to reduce memory access time. Cache memories exploit two characteristics of memory access to reduce access time: temporal locality, the tendency of computer programs to repeatedly access the same memory locations; and spatial locality, the tendency of computer programs to access memory locations that are close to one another.

In order to exploit temporal and spatial locality, data from frequently accessed regions of system memory are stored in cache memory. That way, subsequent accesses to the cached memory regions will not incur the full system memory access time, but the shorter cache access time instead. A memory transaction that accesses cache memory instead of main memory is called a cache hit, and the cache "hit-rate" is a fundamental metric of cache operation.

Several techniques have been employed to increase cache hit-rates. For example, to further exploit spatial locality, caches have been designed with increasingly larger row sizes. The size of a cache row (also called a cache line) defines the quantum of data stored in a cache memory after a cache miss. As the row size increases, it becomes more likely that subsequent memory accesses will address data in the row, thus improving the cache hit-rate.

Temporal locality is exploited to improve cache hit-rate by providing multiple storage elements that are addressed by the same cache index. The storage elements are commonly referred to as "ways" and a cache memory that has multiple ways is called a "multiple-way, set-associative cache". The idea behind multiple-way cache memories is to allow more than one system memory address to correspond to each cache index. Because the cache index is a sub-field of the overall system memory address, multiple-way design avoids repeated cache misses that occur in single-way designs when different addresses having the same cache index are accessed in succession. In single-way or "direct-mapped" cache designs, successive accesses at memory locations having the same cache index result in a sequence of cache miss/cache update operations. This phenomenon is referred to as "thrashing" because data is rapidly swapped into and out of the cache, and much of the benefit of the cache memory is lost.

Despite the advantages of multiple-way, set-associative cache memories, a significant amount of thrashing still occurs when the processor switches between tasks or functions that have dislocated code and data spaces. For example, if, while executing a first task having program code located within a given region of system memory, the processor switches to a second task having program code located within a different region of system memory, it is likely that program code for the first task will be swapped out of the cache in favor of program code for the second task. Consequently, as the processor continues to switch between the first and second tasks, significant number of cache misses occur, thus lowering the average cache hit-rate.

Similarly, when a single task alternately processes data stored in two different regions in memory (e.g., an audio data store and a video data store in a multi-media application), cache thrashing tends to occur as the task alternates between processing the two different data stores.

SUMMARY OF THE INVENTION

A method and apparatus for compartmentalizing a cache memory are disclosed. A cache memory having a plurality of storage compartments receives one or more cache compartment signals at one or more inputs. The cache compartment signals are from a source external to the cache memory. Based on the one or more cache compartment signals, cache compartment logic selects one of the plurality of storage compartments to store data after a cache miss.

BRIEF DESCRIPTION OF THE DRAWINGS

The present invention is illustrated by way of example and not limitation in the figures of the accompanying drawings in which like references indicate similar elements and in which:

FIG. 3 is a logic table describing the operation of way update logic.

FIG. 4 is a table of instructions that can be used to generate compartment control signals.

FIG. 7 is a logic table describing the operation of way update logic.

FIG. 8 is a table of instructions that can be used to generate compartment control signals.

DETAILED DESCRIPTION

The hit-rate of a cache memory is improved in the present invention by compartmentalizing the cache memory under software control. According to one embodiment, special no-operation (NOP) instructions available in existing microprocessors are used to cause compartment control signals to be sent to a cache memory. The compartment control signals are used by cache logic to determine which way of a multiple-way cache should be updated in response to a cache miss. By issuing a NOP instruction that selects a particular way, or group of ways, to be updated in response to a cache miss, a task effectively selects a compartment of the cache in which data and code for that task is to be stored. By coding different tasks (processes or threads) to select different cache compartments, thrashing caused by task switching can be reduced so that a higher cache hit-rate is achieved. Similarly, tasks which must alternately access data located in different regions of system memory can be coded to select respective cache compartments for each region of data to be processed. This technique further reduces thrashing so that a higher cache hit-rate is achieved.

Figure 1:
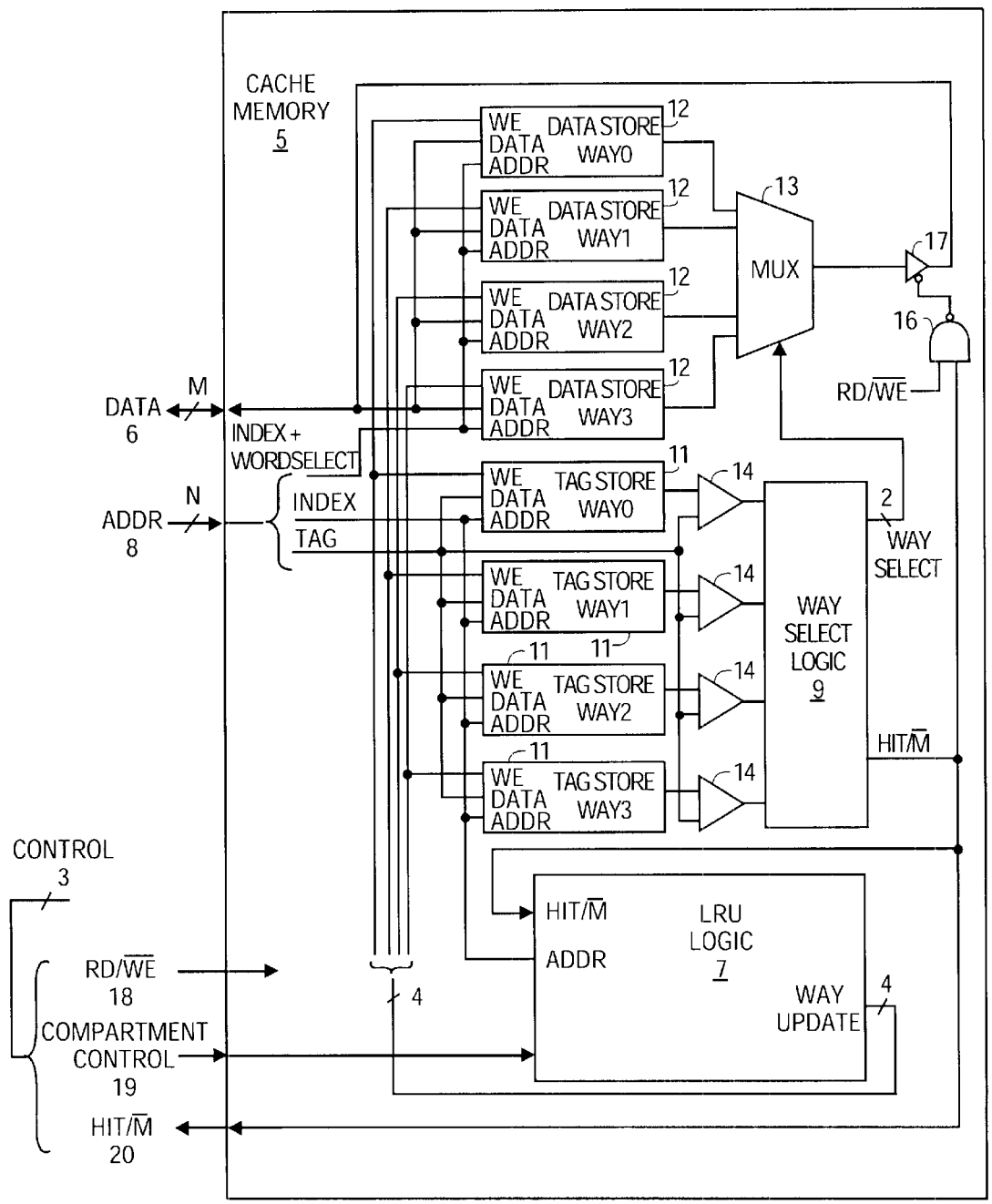
FIG. 1 is a diagram of a cache memory.

FIG. 1 is a block diagram of a cache memory 5 according to one embodiment of the present invention. The cache memory 5 is a four-way, set-associative cache memory and includes four data ways 12 for storing data, four tag ways 11 for storing address tags, comparators 14, way select logic 9, multiplexer 13, logic gates 16 and 17 and least-recently-used (LRU) logic 7. The four data ways 12 constitute the data storage of the cache memory and the four tag ways 11 constitute the tag memory of the cache memory 5.

As shown in FIG. 1, the cache memory 5 is coupled to an M-bit data path 6 and an N-bit address path 8. The cache memory is also coupled to a control path 3 that supplies one or more compartment control signals 19, a read/write signal (RD/WE*) 18 indicating whether a read or write is requested, and an output conductor to transmit a hit/miss signal (HIT/M*) 20 from the cache memory 5 to an access-requesting device. Other control inputs and outputs may also be provided on control path 3. Also, in alternate designs, the hit/miss signal 20 or the one or more compartment control signals 19 may be transmitted by conductors that are not included in control path 3.

The data path 6, address path 8 and control path 3 are typically part of a system bus that intercouples the cache memory 5 with a microprocessor, a system memory and various other processor-addressable components. Alternatively, the data path 6, address path 8 and control path 3 may be part of a more limited bus such as a bus dedicated between the cache memory 5 and a processor.

Each address asserted on the address path 8 is an N-bit wide signal that includes a tag, an index and a word-select field. The most significant bits of the address constitute the tag, the next most significant bits of the address constitute the index and the least significant bits of the address constitute the word-select field.

For each new address received on the address path, the index and word-select portions of the address are asserted to address the data ways 12. The index selects a full cache row within each of the data ways 12 and the word-select bits select a word within the selected cache row. The selected word in each data way 12 is output to a respective input of the multiplexer 13.

The index portion of each new address received on the address path 8 is also asserted to address the tag ways 11. The index selects one previously stored tag from each tag way 11. The selected tags are output by the tag ways 11 to respective comparators 14 where they are compared to the tag portion of the address supplied on the address path 8. Each of the comparators 14 outputs a binary signal to the way select logic 9 indicating whether the previously stored tag matches the tag portion of the address on the address path 8. Because tags are stored in a tag way 11 only if there is a miss, the same tag is not stored in more than one tag way 11 for a given index. Consequently, at most one of the four comparators 14 will assert a signal indicating a tag match for any new address received on the address path 8.

If none of the four comparators 14 indicates a tag match, the way select logic 9 will output a miss signal (e.g., a logic low level HIT/M* signal) to indicate the tag miss. The miss signal is output by the cache memory 5 to the processor or bus controller via hit/miss signal conductor 20 to indicate that system memory must be accessed. The miss signal is also supplied to the LRU logic 7 to enable the LRU logic 7 to select one of the four tag ways 11 to be updated with the missed tag and to select a corresponding one of the four data ways 12 to receive data corresponding to the missed address. Also, the miss signal is supplied to an input of a logic gate 16 which outputs a signal to the tri-state buffer 17 to decouple the output of the multiplexer 13 from the data path 6. This avoids contention on the data path 6 between data read from system memory and data output by the multiplexer 13.

If one of the four comparators 14 indicates a tag match, the way select logic 9 outputs a way select signal indicating which tag way 11 contains the matching tag. The way select signal is supplied to the input of the multiplexer 13 to select the output of the data way 12 corresponding to the tag way 11 that contains the matching tag. The way select logic 9 also outputs the hit signal (e.g., a logic high level HIT/M* signal) on hit/miss conductor 20 to indicate to the processor or bus controller that the cache memory 5 contains the value corresponding to the accessed memory address. The hit signal is also asserted to the logic gate 16 which, if a read operation is indicated by read write signal 18 (i.e., a logic high level RD/WE* signal), outputs a signal to cause the tri-state buffer 17 to couple the output of the multiplexer 13 to the data path 6. This enables a value from the selected data way 12 onto the data path 6 where it can be received in the requesting device.

If the read/write signal 18 indicates a data write operation (i.e., alogic low level RD/WE* signal), the output of the multiplexer 13 is decoupled from the data path 6 by the tri-state buffer 17. Assuming a cache hit, the way select signal is then used to select the data way 12 to be updated with new data and the tag way 11 to be updated with the corresponding tag. Additional logic (not shown in FIG. 1) is provided for this purpose.

As shown in FIG. 1, the index portion of each new address is also received in the LRU logic 7. In the event that a cache miss occurs, the LRU logic 7 determines the data way 12 least recently accessed at the given index. This way is referred to as the "least recently used" way. The LRU logic 7 then outputs a multiple-bit way-update signal to select one of the four data ways 12 and a corresponding one of the four tag ways 11 to be written with updated information. According to one embodiment of the present invention, the LRU logic 7 also receives the one or more compartment control signals 19 which affect the selection of the data and tag ways to be updated.

Figure 2:
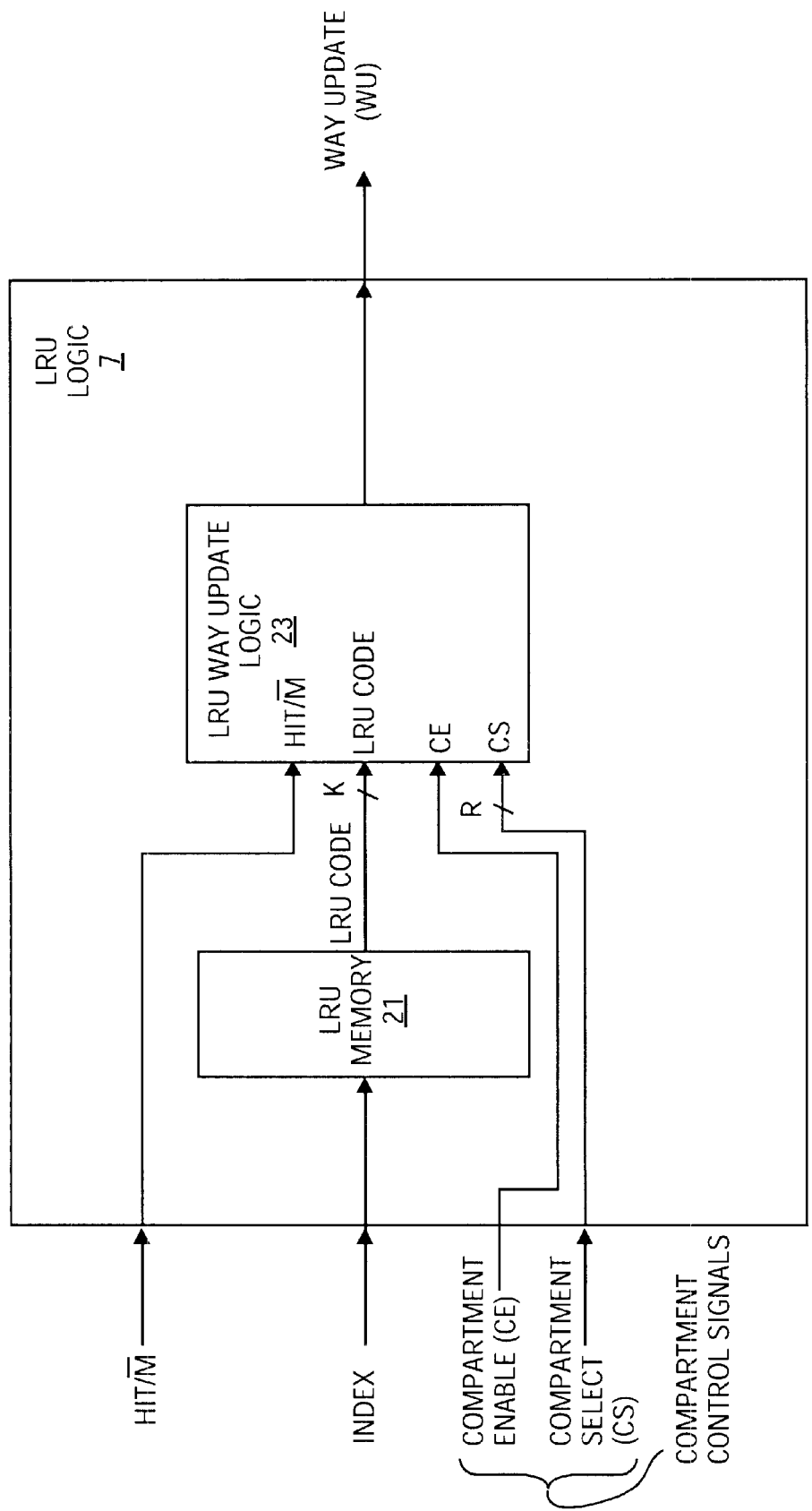
FIG. 2 is a diagram of Least-Recently-Used (LRU) logic.

FIG. 2 is a block diagram of the LRU logic 7 of FIG. 1 according to one embodiment of the present invention. As described above, the LRU logic 7 receives cache hit/miss signal (HIT/M*) and the index portion of an address. The index is suppled to an LRU memory 21 that contains a data value, referred to herein as a "LRU code", indicating the least recently used one of the data ways (e.g., element 12 of FIG. 1).

In one type of LRU logic design, called a "pseudo LRU", the LRU code is made up of a number of bits (k) equal to the number of data ways in the cache memory. Each bit position in the LRU code corresponds to one of the data ways of the cache memory and one bit in each LRU code is set to a state different than all of the other bits to indicate that the indicated data way and its corresponding tag way should be used to receive new data and tag bits, respectively, after a cache miss. The LRU code is then updated to indicate that another one of the ways should be used when the next miss occurs.

One disadvantage of the pseudo LRU technique is that the LRU code does not indicate the order of all of the ways from most recently used to least recently used. Consequently, after a way indicated to be the least recently used way is updated with new data, there is no indication of which of the remaining ways should become the new least recently used way. One of the remaining ways must be selected at random or according to predetermined logic.

A true LRU logic design avoids the above-described problem by providing an LRU memory containing enough bits per index to indicate a complete hierarchy of the ways from most recently used to least recently used. This information is then used select the next least recently used way after every cache update. The present invention may be used in combination with any technique for selecting a way to update in response to a cache miss, including the pseudo and true LRU techniques. For the sake of simplicity, however, a pseudo LRU scheme is assumed in the following description.

As shown in FIG. 2, the LRU code output by the LRU memory 23 and the hit/miss signal HIT/M* are input to LRU way update logic 23. The LRU way update logic 23 also receives compartment control signals (e.g., element 19 of FIG. 1) which, according to one embodiment of the present invention, include a compartment enable signal CE and one or more (r) compartment select signals CS. As discussed further below, the compartment enable CE and compartment select CS signals are determined by software execution so that computer programmers can specify compartments within the cache in which frequently accessed data and code is to be stored. This can significantly reduce cache thrashing that otherwise occurs when task switching takes place and when programs access separately located code stores or data stores.

FIG. 3 depicts a logic table 27 that describes the logical operation of the LRU way update logic 23 of FIG. 2. The logic table 27 lists an exemplary set of inputs to the LRU way update logic, including a compartment enable signal CE, two compartment select signals CS1 and CS0, and a LRU code having constituent signals LCode3, LCode2, LCode 1 and LCode0. The outputs listed in the logic table represent an exemplary set of outputs from the LRU way update logic, including way update signals WU3, WU2, WU1 and WU0.

As indicated in the first four rows of the logic table 27, when the compartment enable signal CE is deasserted (as indicated by a "0"), the state of the compartment select signals CS1 and CS0 do not affect the state of outputs WU3–WU0. Consequently, in the first four rows of the logic table 27, CS1 and CS0 are indicated to have state X, indicating that they may be in any state.

When the compartment enable signal CE is deasserted, outputs WU3–WU0 are determined by the LRU code. Thus, in the first row, when signal LCode0 is asserted (indicated by a "1" in the logic table 27), WU0 is asserted at the LRU logic output to select data way 0 and tag way 0 to be updated. Similarly, as shown in the second, third and fourth rows of the table, assertion of LCode1, LCode2 and LCode3 results in WU1, WU2 and WU3, respectively, being asserted at the LRU logic output. In other words, so long as the compartment enable signal CE is deasserted, whichever way is indicated by the LRU code to be the least recently used is selected to be updated in response to the cache miss. In the logic table 27, the bits of the LRU code have arbitrarily been prioritized so that if more than one bit of the LRU code is set, LCode0 takes priority over LCode1 which takes priority over LCode2 which takes priority over LCode3. Other priority schemes could be used.

In the bottom four rows of the logic table, the compartment enable signal CE is asserted and the way to update is determined based on the compartment select signals CS1 and CS0. According to one embodiment of the present invention, a simple binary code is used so that the value of the compartment select signals CS1 and CS0, taken together (i.e., 00=0, 01=1, 10=2, 11=3), indicates the way to update. Thus, for each different combination of compartment select signals CS1 and CS0 a different way update output is asserted. Assertion of the compartment enable signal CE effectively overrides the least recently inputs LCode3–LCode0 so that the state of those inputs is indicated to be "X".

FIG. 4 is a table 28 of instructions that can be used to generate the compartment control signals discussed in reference to FIG. 2 and FIG. 3. According to one embodiment of the present invention, an instruction indicating a write operation to a read-only register within a processor is used to implement compartment control. For example, register R0 is a read-only register within microprocessors from Intel Corporation. Ordinarily, attempting to write a value to register R0 has no effect on the processor state and is considered a NOP instruction (i.e., no-operation). However, by providing logic within the microprocessor to detect an attempt to write to register R0 and then to output compartment control signals based on the operand being written, it becomes possible to write program code that issues cache compartment control instructions in the modified microprocessor, but which has no effect in existing microprocessors. In other words, program code which includes the compartment control instructions may be executed by microprocessors that do not support compartment control without adverse effect. It will be appreciated that, rather than use presently available instructions in the manner described above, new instructions could also be added to an existing instruction set to provide cache compartment control.

Still referring to FIG. 4, the operation indicated by each instruction and the compartment control signals that result from execution of the instruction are shown. Referring to the first row of table 28, for example, instruction OUT R0, 0 indicates that the value 0 is to be transferred to register R0. As discussed above, because register R0 is a read-only register, the contents of register R0 are unaffected by this operation. However, in the modified processor architecture described above, execution of this instruction causes the processor to assert a compartment enable signal (e.g., CE=1) and to assert compartment select signals (CS1=0, CS0=0) that select cache data way 0 to be the cache compartment. After a cache miss, data way 0 is selected to receive updated data and tag way 0 is selected to receive the missed tag.

According to one embodiment of the present invention, the operand attempted to be written to register R0 is used to indicate different compartment control modes. Thus, for each successive instructions listed in table 28, the value of the operand to be written to register R0 is incremented. When the Out R0 instruction is executed with an operand of 1, the compartment enable signal is asserted and compartment select signals are output to enable way 1 to be the cache compartment; when the operand is 2, the compartment enable signal is asserted and compartment select signals are output to select way 2 to be the cache compartment; when the operand is 3, the cache compartment enable signal is asserted and compartment select signals are output to select way 3 to be the cache compartment; and when the operand is 04, the compartment enable signal is deasserted (CE=0) to disable cache compartmentalization and to allow the least recently used logic to determine which way to be updated after a cache miss. Operands higher than 04 may default to one of the states described above (e.g., compartmentalization off) or may be reserved for expanded compartmentalization features.

Although in the above-described embodiment of the present invention the cache compartments are of equal size and correspond to respective cache ways, it may be desirable to have cache compartments of different sizes. For example, if a computer programmer recognizes in advance that one task (or program operation) will require significantly more memory access than another task, the programmer may want to allocate a larger cache compartment to the more memory intensive task and a smaller cache compartment to the less memory intensive task.

Figure 5:
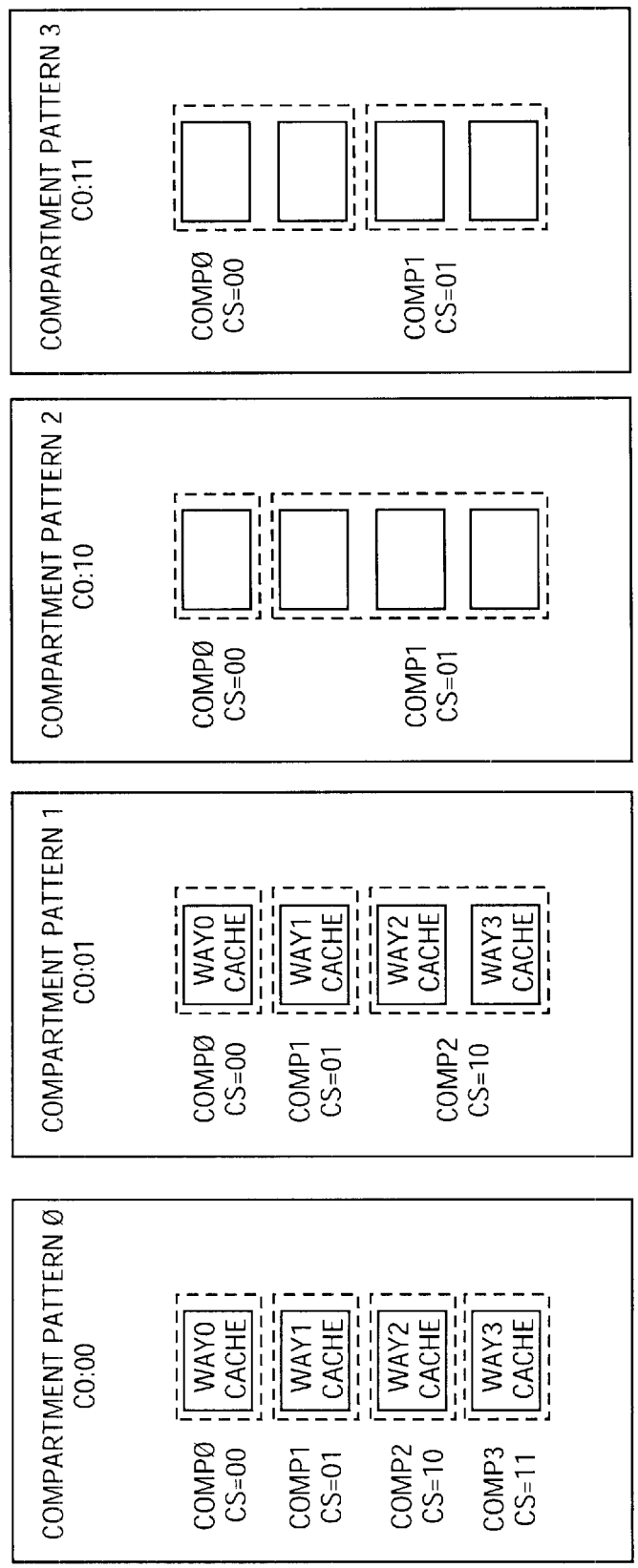
FIG. 5A is a diagram of a cache organization.
FIG. 5B is a diagram of a cache organization.
FIG. 5C is a diagram of a cache organization.
FIG. 5D is a diagram of a cache organization.

FIG. 5A, FIG. 5B, FIG. 5C and FIG. 5D illustrate different cache organizations that can be used to implement varied cache compartment sizes according to one embodiment of the present invention. The different cache organizations are referred to as compartment patterns and are selected by compartment organization signals (CO). Referring to FIG. 5A, for example, with CO signals set to 0,0, a cache compartment organization is selected in which each of the ways of a four-way cache is allocated to a respective cache compartment. As indicated in FIG. 5A, compartment select signals CS=00, 01, 10 and 11 select compartments 0, 1, 2 and 3, respectively. The compartment pattern depicted in FIG. 5A is referred to as compartment pattern 0 and is equivalent to the four compartment scheme described above in reference to FIG. 2 and FIG. 3.

FIG. 5B illustrates compartment pattern 1, which is selected when cache organization signals CO are set to 0,1. In compartment pattern 1, way 0 is allocated to compartment 0, way 1 is allocated to compartment 1 and ways 2 and 3 are allocated to compartment 2. As a result, three cache compartments are provided with one cache compartment being twice the size of either of the other two compartments. Compartment select signals CS=00, 01 and 10 select compartments 0, 1 and 2, respectively.

FIG. 5C illustrates compartment pattern 2, which is selected when cache organization signals are set to 1,0. In compartment pattern 2, way 0 is allocated to compartment 0 and ways 1, 2 and 3 are allocated to compartment 1. Thus, two cache compartments are provided with one cache compartment being three times the size of the other. Compartment select signals CS=00, and 01 select compartments 0 and 1, respectively.

FIG. 5D illustrates compartment pattern 3, which is selected when cache organization signals are set to 1,1. In compartment pattern 3, two equally sized compartments are provided: compartment 0 to which ways 0 and 1 are allocated, and compartment 1 to which ways 2 and 3 are allocated. Compartment select signals CS=00, and 01 select compartments 0 and 1, respectively.

It will be appreciated that the number of different compartment patterns that can be achieved increases with the number of ways in a multiple-way cache. Also, while a way-based allocation scheme has been described, any technique for allocating memory within the cache to different cache compartments that can be selected under software control is within the spirit and scope of the present invention.

Figure 6:
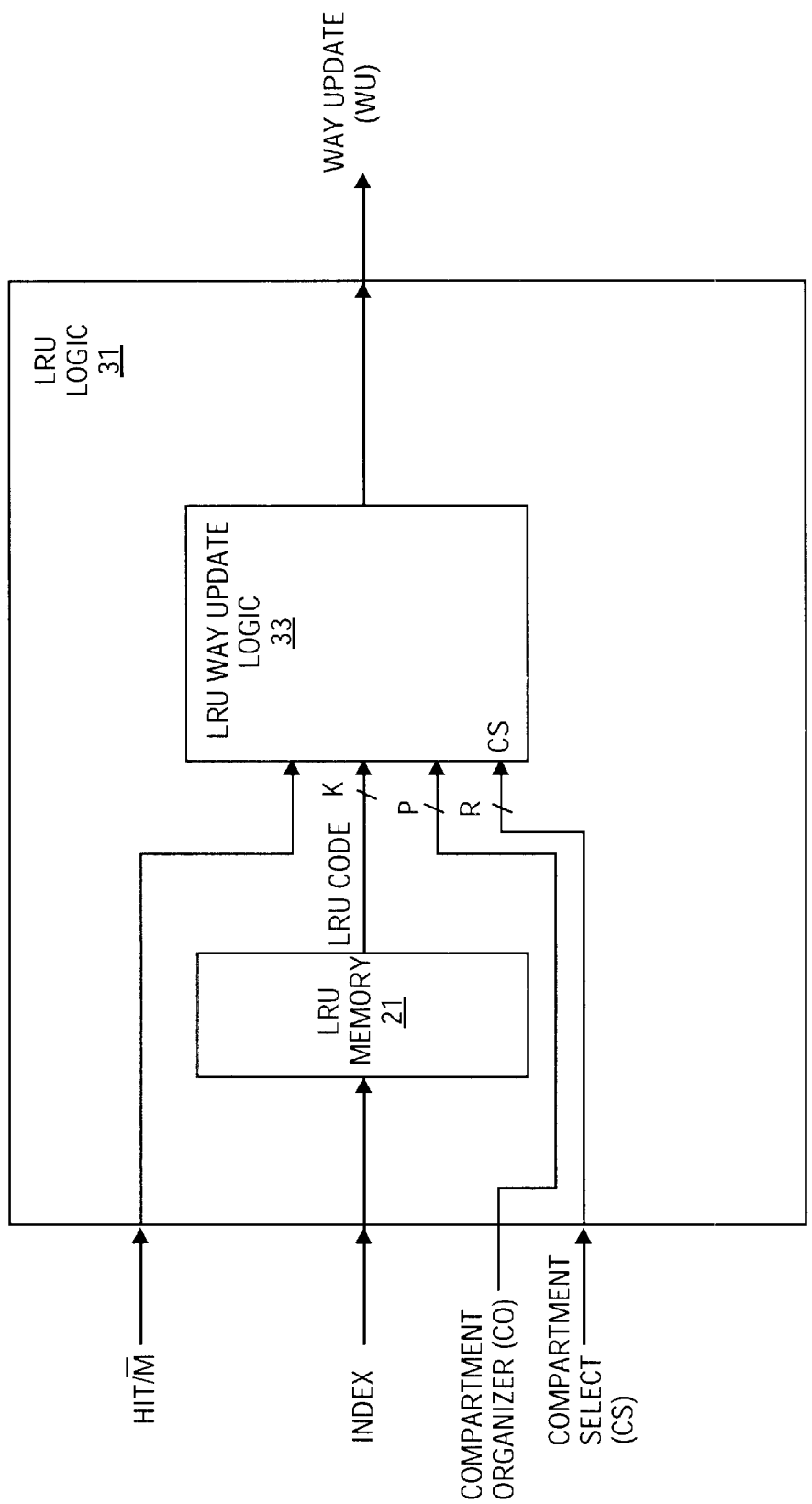
FIG. 6 is a diagram of Least-Recently-Used logic.

FIG. 6 is a diagram of LRU logic 31 that can be used to support the software-selectable compartment patterns shown in FIG. 5A, FIG. 5B, FIG. 5C and FIG. 5D. The LRU logic 31 is similar to the LRU logic 7 described in reference to FIG. 2, except that, instead of receiving a compartment enable signal, the LRU logic 31 receives one or more (p) compartment organization signals (CO). The compartment organization signals are supplied to the LRU way update logic 33 and determine whether cache compartmentalization is enabled and, if so, which cache compartment pattern to use (e.g., compartment pattern 0, 1, 2 or 3, described above).

FIG. 7 is a logic table 36 that describes the operation of the LRU way update logic 33 of FIG. 6. According to one embodiment of the present invention, the LRU way update logic receives two cache organization signals, CO1 and CO0, two compartment select signals, CS1 and CS0, and four LRU code signals LCode3, LCode2, LCode1 and LCode0. If a cache miss occurs, the LRU way update logic asserts one of four way update outputs, WU3, WU2, WU1 or WU0, to enable a cache data way and its corresponding cache tag way to be updated.

For rows 1–4 of the logic table, the cache organization signals CO1 and CO0 are both set to zero, thereby selecting compartment pattern 0. As discussed above, each of the four cache ways is allocated to a respective one of four compartments in compartment pattern 0. Consequently, the compartment select signals CS1 and CS0 determine which way is updated after a cache miss. Thus:

if CS1,CS0=0,0 compartment 0 is selected and way update signal WU 0 is asserted to enable way 0 to be updated;
if CS1,CS0=0,1 compartment 1 is selected and way update signal WU 1 is asserted to enable way 1 to be updated;
if CS1,CS0=1,0 compartment 2 is selected and way update signal WU 2 is asserted to enable way 2 to be updated; and
if CS1,CS0=1,1 compartment 3 is selected and way update signal WU 3 is asserted to enable way 3 to be updated.

So long as compartment pattern 0 is selected (i.e., CO1, CO0=0,0), the LRU code (inputs LCode3–LCode0) has no effect on the way selected to be updated.

For rows 5–12 of the logic table, cache organization signals CO1 and CO0 are set to 0 and 1, respectively, thereby selecting compartment pattern 1. Referring to FIG. 5B, compartment pattern 1 contains three compartments, with way 0 being allocated to compartment 0, way 1 being allocated to compartment 1, and ways 2 and 3 being allocated to compartment 2. Consequently:

if CS1,CS0=0,0 compartment 0 is selected and way update signal WU 0 is asserted to enable way 0 to be updated;
if CS1,CS0=0,1 compartment 1 is selected and way update signal WU 1 is asserted to enable way 1 to be updated; and
if CS1,CS0=1,0 compartment 2 is selected and either way update signal WU2 or WU3 is asserted.

Note that when compartment 2 is selected (CS1, CS0=1, 0), then a determination must be made of which way (way 2 or way 3) within compartment 2 should be updated. According to one embodiment of the present invention, way 2 is the default way to update unless the LRU code indicates that way 3 is the least recently used way. Thus, way update signal WU2 is asserted to enable way 2 to be updated if the LRU code indicates that way 3 is not the least recently updated way (i.e., LCode3=0). If, on the other hand, the LRU code indicates that way 3 is the least recently updated way, way update signal WU3 is asserted to enable way 3 to be updated. It will be appreciated that other techniques may be used to determine which way of a multiple-way compartment should be updated.

Because compartment pattern 1 contains only three compartments, compartments 0, 1 and 2, then an attempt to select a fourth compartment by setting CS1, CS0 is invalid. Consequently such an attempt can be used for other purposes, such as disabling cache compartmentalization. More generally, when CS1 and CS0 select a compartment that is not present in the compartment pattern indicated by compartment organization signals CO1 and CO0, the LRU way update logic may default to the least recently used logic described above. Referring, for example to rows 9–12 of the logic table, because CS1 and CS0 indicate a compartment (compartment 3) which is not included in compartment pattern 1, the LRU code inputs, LCode3, LCode2, LCode1 and LCode0 are relied upon to determine which way to update. This logic is as described above in reference to FIG. 3 when the compartment enable signal (CE) is deasserted.

Referring now to rows 13–16 of the logic table, cache organization signals CO1 and CO0 are set to 1 and 0, respectively, thereby selecting compartment pattern 2. Referring to FIG. 5C, compartment pattern 2 contains two compartments, with way 0 being allocated to compartment 0 and ways 1, 2 and 3 being allocated to compartment 1. Consequently:

if CS1,CS0=0,0 compartment 0 is selected and way update signal WU 0 is asserted to enable way 0 to be updated; and if CS1,CS0=0,1 compartment 1 is selected and either way update signal WU1, WU2 or WU3 is asserted.

When compartment 1 is selected (CS1, CS0=0,1), then a determination must be made of which way (way 1, way 2 or way 3) within compartment 1 should be updated. According to one embodiment of the present invention, way 1 is the default way to update unless the LRU code indicates that either way 2 or way 3 is the least recently used way. If way 2 is the least recently used way, then signal WU2 is asserted to enable way 2 to be updated. Otherwise, if way 3 is the least recently used way, then signal WU3 is asserted to enable way 3 to be updated. As stated above, other techniques may be used to determine which way of a multiple-way compartment should be updated.

Momentarily skipping rows 17–20 of the logic table and referring to rows 21–24, cache organization signals CO1 and CO0 are both set to 1, thereby selecting compartment pattern 3. Referring to FIG. 5D, compartment pattern 3 contains two compartments with ways 0 and 1 being allocated to compartment 0 and ways 2 and 3 being allocated to compartment 1. Consequently:

if CS1,CS0=0,0 compartment 0 is selected and either way update signal WU0 or WU1 is asserted; and if CS1,CS0=0,1 compartment 1 is selected and either way update signal WU2 or WU3 is asserted.

When compartment 0 is selected (CS1, CS0=0,0), then it must be determined whether to update way 0 or way 1. Likewise, when compartment 1 is selected, then a determination of whether to update way 2 or way 3 must be made. According to one embodiment of the present invention, when compartment 0 is selected, way 0 is updated unless the LRU code indicates that way 1 is the least recently used way. If the LRU code indicates that way 1 is the least recently used way (i.e., LCode1=1), then way 1 is updated. Similarly, when compartment 1 is selected, way 2 is the default way to update unless the LRU code indicates that way 3 is the least recently used way. If the LRU code indicates that way 3 is the least recently used way (i.e., LCode3=1), then way 3 is updated. Again, other techniques may be used to determine which way of a multiple-way compartment should be updated.

Returning now to rows 17–20 of the logic table, because compartment patterns 2 and 3 each have only two compartments (viz., compartments 0 and 1), then whenever either compartment pattern 2 or 3 is selected (i.e., CO1=1, CO0=X), a compartment selection of 2 or 3 (i.e., CS1=1, CS0=X) is invalid. This condition is shown in rows 17 to 20. According to one embodiment of the present invention, whenever compartment 2 or 3 is selected for compartment pattern 2 or 3, cache compartmentalization is disabled. When cache compartmentalization is disabled, the LRU way update logic defaults to the least recently used logic described above in reference to FIG. 3 when the compartment enable signal (CE) is deasserted.

FIG. 8 is a table 38 of instructions that can be used to generate the compartment control signals described in reference to FIG. 6 and FIG. 7. As in above-described embodiments, instructions specifying a write operation to a read-only register (e.g., register R0) are used to implement compartment control. Other techniques may be used.

One assembly language instruction is listed in each row of the table. Beside the instruction is the indicated operation, and the compartment control signals that are output when the instruction is executed. As discussed above, because a read-only register is selected to be written, execution of the instruction is effectively a NOP for microprocessors which do not support compartment control. However, a microprocessor having an architecture modified according to the present invention detects the attempts to write to register R0 and asserts compartment control signals according to the operand to be written. For example, instruction OUT R0, 0 indicates that the value 0 is to be transferred to register R0. When executed, this instruction has no effect on microprocessors that do not support compartment control. However, in a microprocessor modified according to the present invention, execution of OUT R0, 0 causes the microprocessor to output compartment control signals specifying compartment pattern 0 (CO1,CO0=0,0) and compartment select signals selectig compartment 0 (CS1,CS0=0,0). As indicated in the table of FIG. 8, when the OUT R0 instruction is executed:

operand 00 selects compartment pattern 0, compartment 0;

operand 01 selects compartment pattern 0, compartment 1;

operand 02 selects compartment pattern 0, compartment 2;

operand 03 selects compartment pattern 0, compartment 3;

operand 04 selects compartment pattern 1, compartment 0;

operand 05 selects compartment pattern 1, compartment 1;

operand 06 selects compartment pattern 1, compartment 2;

operand 07 selects compartment pattern 2, compartment 0;

operand 08 selects compartment pattern 2, compartment 1;

operand 09 selects compartment pattern 3, compartment 0; and operand 0A (hex) selects compartment pattern 3, compartment 1.

According to one embodiment of the present invention, cache compartmentalization is disabled when OUT R0, B(hex) is executed. One way to signal the cache memory that compartmentalization is disabled is to issue compartment select signals that select an invalid compartment. This is shown in the last line of the table where a compartment pattern having only two compartments is specified (compartment pattern 3) and yet compartment 3 is selected by the compartment select signals.

Figure 9:
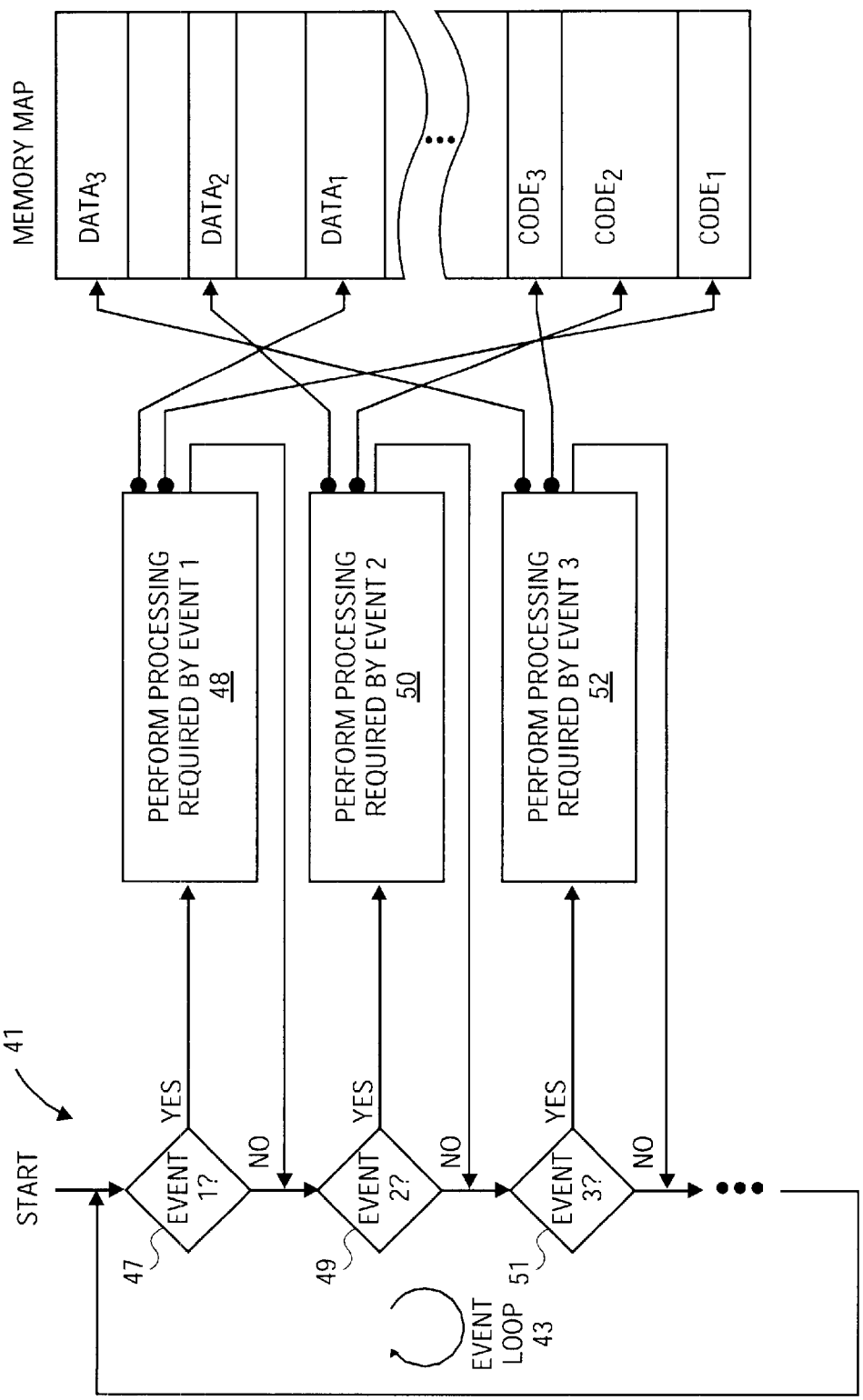
FIG. 9 is a flow diagram of a computer program in which cache compartmentalization can be used to improve the cache hit-rate.

FIG. 9 illustrates the flow and memory access of a computer program 41 in which cache compartments may be used to improve the cache hit-rate. The program 41 consists of an event loop 43 that is repeatedly executed to determine whether certain events have occurred. This construct is commonly used in application programs which must interact with a user. If an event is detected, program execution branches to perform processing required by the event. Because the events requiring processing are often user-initiated, it is undesirable for program execution to become hung up processing any one event for too long. Otherwise, there can be a noticeable delay before other user-initiated events are detected, causing the system to seem sluggish and unresponsive. Consequently, when an event requiring extensive code execution or time-consuming operations is detected, it is common to execute only a portion of the required processing for each pass through the event loop. The effect is a sort of task or context switching which tends to cause cache thrashing.

As shown at step 47 of program 41, when event 1 is detected, program execution branches to step 48 to execute program code stored in the region of memory labeled CODE1. Execution of CODE1 results in operation on data stored in memory region DATA1. Access to CODE1 and DATA1 will cause data from those regions of memory to be cached in the computer system's cache memory. As an aside, it will be appreciated that both program code and program data is cached in the cache memory. From the standpoint of the cache memory however, the program code and the program data are both forms of data and are referred to collectively herein simply as "data".

Suppose now that, after completing a portion of the processing required by event 1 (i.e., after completing step 48), program execution returns to the event loop 43 and event 2 is detected at step 49. Now the processing (step 50) required by event 2 requires access to memory regions CODE2 and DATA2 so that a substantial number of cache miss/update operations are likely to occur. Similarly, if, after completing a portion of the processing required by event 2 at step 50, event 3 is detected at step 51, then values from memory regions CODE2 and DATA2 are likely to be replaced in the cache by values from memory regions CODE3 and DATA3 during processing step 52. When the processing required by event 1 is resumed at step 48, values from memory regions CODE3 and DATA3 will be replaced by values from memory regions CODE1 and DATA1, and so forth.

Figure 10:
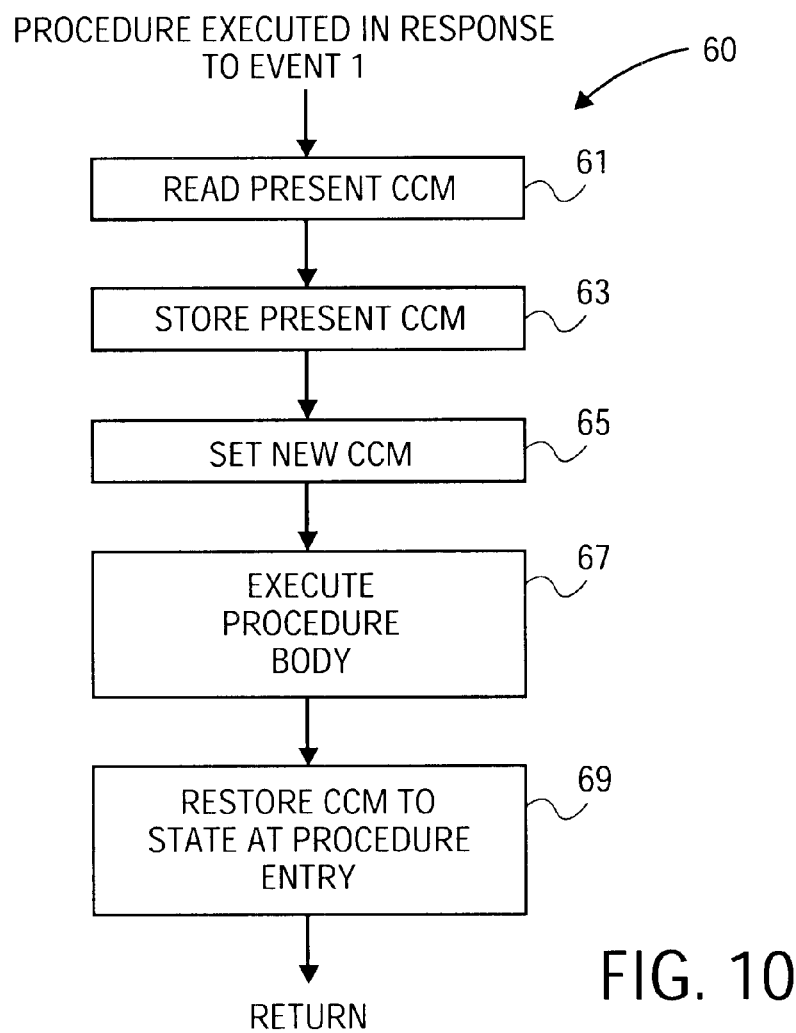
FIG. 10 is a flow diagram illustrating one technique for using cache compartment control .

FIG. 10 is a flow diagram 60 illustrating one technique for using cache compartment control to reduce cache thrashing and to improve the overall cache hit-rate. The flow diagram 60 corresponds to a portion of the processing peformed, for example, at step 48 of FIG. 9. At step 61 a value indicating a present cache compartment mode (CCM) is read. The CCM value may be a globally accessible data value or may be obtained by a invoking a procedure or method. At step 63 the CCM value is stored for later recall. At step 65, a new cache compartment mode is established. According to one embodiment of the present invention, this is accomplished by executing one or more instructions that cause the processor to issue compartment control signals to the cache memory and then by setting the CCM value to indicate that a new cache compartment mode has been set. If a cache miss occurs after step 65 is completed, updated data will be stored in a cache compartment according to the new cache compartment mode.

After a cache compartment has been selected, the procedure body is executed at step 67. After step 67 is completed, the cache compartment mode is restored at step 69. According to one embodiment of the present invention, the cache compartment mode is restored by reading the original CCM value from its temporary storage location, executing instructions to cause the processor to issue the necessary compartment control signals, then writing the original CCM value back to the globally accessible location (again, either via global variable access or via a procedure or method call).

By selecting a different cache compartment in response to each of the three events (47, 49, 51) described in reference to FIG. 9, cache thrashing can be reduced and a higher overall cache hit-rate achieved.

Figure 11:
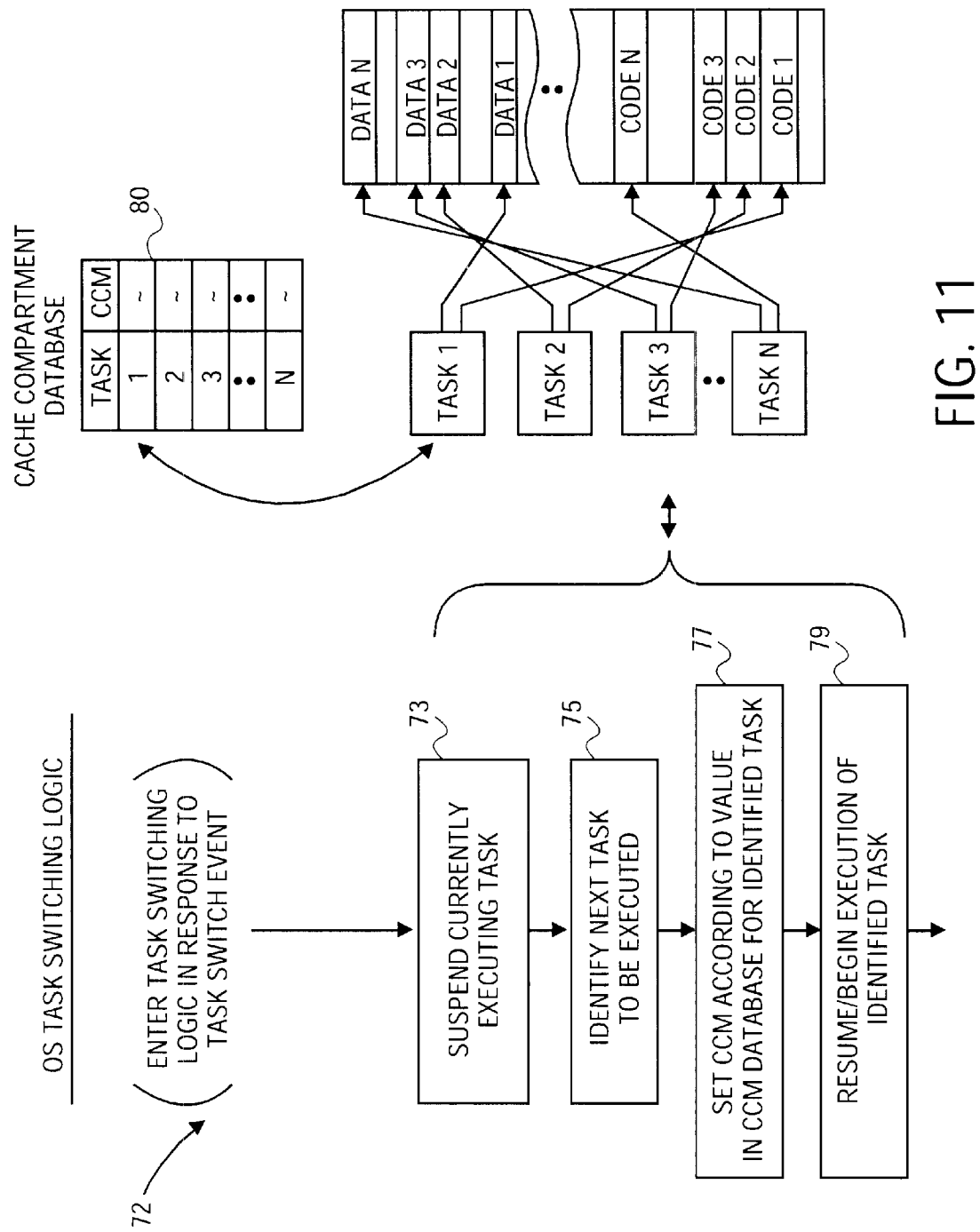
FIG. 11 is a flow diagram of task switching logic.

FIG. 11 illustrates another embodiment of the present invention that provides software-controlled cache compartmentalization. In an operating system (OS) that implements task switching (the tasks being processes, threads or both), the individual tasks often access different regions of memory to obtain code and data. As shown in FIG. 11, for example, if tasks 1, 2, 3 . . . N are being concurrently executed, task 1 may access regions code1 and data1, task 2 may access regions code2 and data 2, task 3 may access regions code 3 and data 3 and so forth. Consequently, when the operating system suspends one task and begins or resumes execution of a another task, a significant number of cache misses will occur and data cached during execution of the suspended task will be kicked out of the cache. Later when the suspended task is resumed, cache misses will occur again and data cached for previously executing tasks will be kicked out. In other words, task switching results in significant cache thrashing and lowers the cache hit-rate.

According to one embodiment of the present invention, the task switching logic (code) within the operating system or an extension of the operating system is modified to provide cache compartment control. This is shown by the flow diagram 72 in FIG. 11. At step 73, after a task switch event occurs (commonly a processor interrupt), the currently executing task is suspended. At step 75, the next task to be executed is identified. At step 77, the cache compartment mode is set based on a value stored in a cache compartment data base 80. The cache compartment database 80 is indexed based on a task identifier and returns a previously stored CCM value for the task. According to an embodiment of the present invention discussed below, the cache compartment database 80 is populated with new CCM values by a task registration procedure that is invoked when a task is intially executed. If initial execution of a task has not yet begun, this fact may be indicated by the cache compartment database 80 so that when the task is first started by the task switching logic, either no change to the present cache compartment mode is made or a default cache compartment setting is issued. At step 79, execution of the identified task is begun or resumed, as the case may be.

Figure 12:
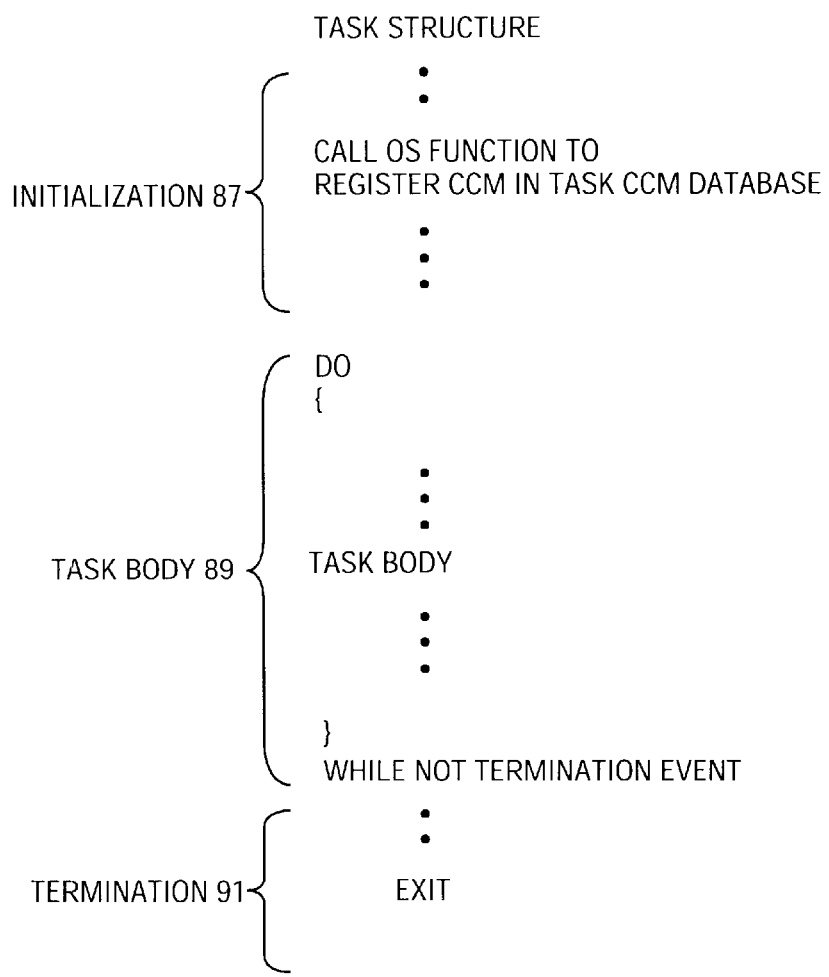
FIG. 12 illustrates a task structure.

FIG. 12 illustrates a task structure according to one embodiment of the present invention. The task includes three components: an initialization component 87, a task body 89 and a termination component 91. Typically, the initialization component 87 of a task is executed only upon initial invocation of the task, and the task body continues to execute (for example in an event loop) until a termination event is detected. The task terminates in response to the termination event.

According to one embodiment of the present invention, each task is programmed to register a desired cache compartment mode (CCM) value in a database maintained by the operating system or an extension of the operating system. As discussed above, the stored CCM value is then used by the task switching logic of the OS to implement the desired compartment control whenever the task is selected for execution. As indicated in FIG. 12, the task registers the CCM value during initialization 87 by calling an operating system service called, for example, "RegisterCCM", passing the desired CCM value and a task identifier as arguments. Other techniques may be used to register the CCM value without departing from the spirit and scope of the present invention.

Figure 13:
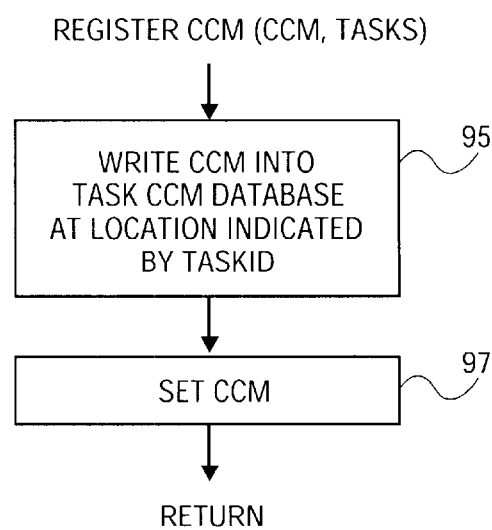
FIG. 13 is a flow diagram of a service for registering a cache compartment mode in a database.

FIG. 13 is a flow diagram of the RegisterCCM service according to one embodiment of the present invention. A CCM value and task identifier are received as input parameters and, at step 95, the CCM value is written into the cache compartment data base (e.g., element 80 of FIG. 11) at a location indicated by the task identifier. Then, at step 97, one or more instructions are executed to cause the processor to output the compartment control signals indicated by the CCM value.

Figure 14:
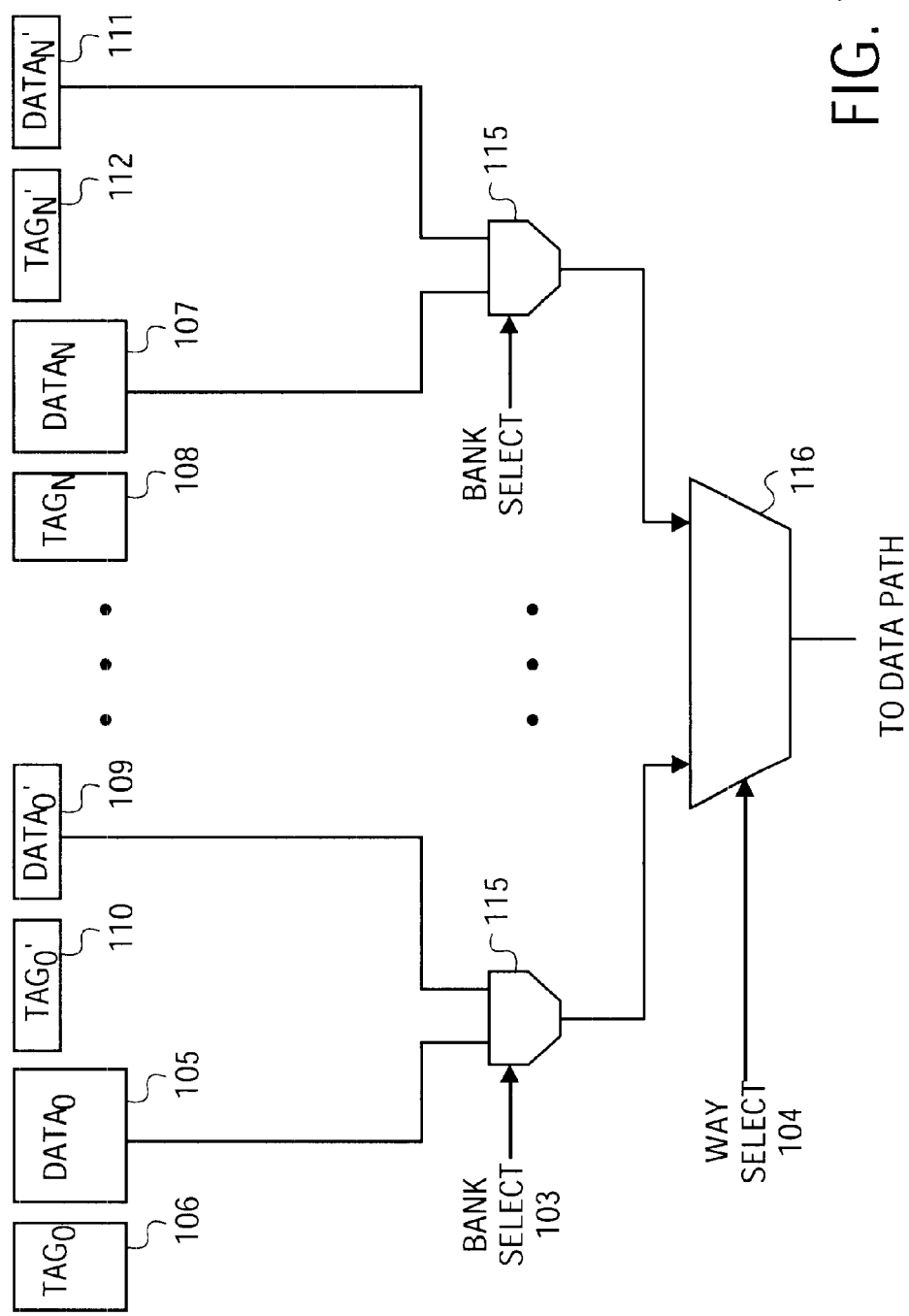
FIG. 14 is a diagram of a cache memory having alternate way banks.

FIG. 14 illustrates an alternate embodiment of the present invention in which a bank select signal 103 is included with the compartment control signals. Depending on the state of the bank select signal 103, alternate banks of tag and data ways are used to implement the cache memory. For example, when the bank select signal 103 is in a first state, the output of data ways 0 through N (105 and 107) are routed by bank select multiplexers 115 to the input of a way select multiplexer 116. When the bank select signal is in a second state, the output of data ways 0' through N' (109 and 111) are instead output by the bank select multiplexers 115 to the way select multiplexer 116. Additional logic (not shown) is provided to select, based on the bank select signal, between tag ways 0 through N (106 and 108) and tag ways 0' through N' (110 and 112) to perform the tag compare function.

One advantage to the selectable way bank design of FIG. 14 is that different sized data ways may be used to implement the various cache compartments. This approach allows programmers to select compartments in the cache memory based on cache requirements of the task being programmed. For tasks requiring extensive memory access a larger task compartment may be selected by including instructions which indicate the appropriate bank selection. Then, when a task that requires less memory access is executed, the bank selection could be dynamically switched (i.e., switched during run-time) to allow selection of a smaller cache compartment.

FIG. 14 illustrates a configuration in which data ways 0 through N (105 and 107) are larger than data ways 0' through N' (109 and 111). The size of the corresponding tags ways is also different. This is because tag way 0 (106) is addressed by a larger index field than tag way 0' (110), so that the number of bits in the tags stored in tag way 0 (106) is correspondingly smaller than the number of bits in the tags stored in tag way 0' (110).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly to be regarded in an illustrative rather than a restrictive sense.

What is claimed is:

1. A cache memory comprising:
   a plurality of storage compartments, wherein each compartment includes a way;
   one or more inputs to receive one or more cache compartment signals from a source external to the cache memory;
   cache compartment logic to select based on the one or more cache compartment signals one of the plurality of storage compartments to store data after a cache miss; and
   logic to select a least recently used way to store data after a cache miss, wherein the logic is overridden by a compartment enable signal received on one of the inputs.

2. The cache memory of claim 1 wherein the one or more inputs include one input to receive a compartment enable signal and N inputs to receive an encoded value indicating one of the plurality of storage compartments.

3. The cache memory of claim 1 wherein the one or more inputs include one or more inputs to receive one or more signals indicating an organization of storage elements within the cache memory into the plurality of storage compartments.

4. The cache memory of claim 3 wherein the storage elements are ways of the cache memory, the ways being allocated to the plurality of storage compartments based on the one or more signals indicating an organization of the storage elements.

5. An apparatus comprising:
   cache memory means for caching data;
   means for providing one or more instructions to a read-only register that indicate a cache compartment pattern;
   means for detecting the instructions;
   means for selecting a least recently used way associated with the cache compartment pattern; and
   means for storing data after a cache miss in the least recently used way in the cache memory based on the cache compartment pattern;
   wherein the cache compartment pattern represents an organization of storage elements into the plurality of storage compartments each having a different size.

6. The apparatus of claim 5 further comprising means for executing one or more instructions including means for fetching an operand indicated by the one or more instructions, the operand indicating the cache compartment pattern.

7. The apparatus of claim 6 wherein the means for executing one or more instructions includes means for asserting one or more compartment selection signals to the cache memory means, the compartment selection signals indicating the one of the plurality of storage compartments.

8. The apparatus of claim 6 wherein the means for executing one or more instructions includes means for asserting one or more compartment organization signals to the cache memory means, the compartment organization signals indicating an organization of storage elements in the cache memory means into the plurality of storage compartments.

9. An apparatus comprising:
   a cache memory including a plurality of storage compartments, wherein each compartment includes a way;
   a processor to execute one or more instructions that indicate a cache compartment pattern; and
   logic to store data after a cache miss in a least recently used way associated with one of the plurality of storage compartments based on the cache compartment pattern, wherein the logic to store data is overridden by a compartment enable signal received by the processor;
   wherein the cache compartment pattern represents an organization of storage elements into the plurality of storage compartments each having a different size.

10. The apparatus of claim 9 wherein the processor includes logic to output one or more compartment selection signals to the cache memory, the compartment selection signals indicating the one of the plurality of storage compartments.

11. The apparatus of claim 9 wherein the processor includes logic to output one or more compartment organization signals to the cache memory, the compartment organization signals indicating an organization of storage elements in the cache memory into the plurality of storage compartments.

12. The apparatus of claim 11 wherein the storage elements are ways in the cache memory.

13. A computer system comprising:

a processor;

a cache memory coupled to the processor and having a plurality of storage compartments, wherein each compartment includes a way; and a system memory having stored therein sequences of instructions, including one or more instructions which, when executed by the processor, cause the processor to output one or more cache compartment signals to a read-only register of the cache memory, the cache compartment signals selecting a least recently used way of one of the plurality of storage compartments to store data in after a cache miss, wherein the instructions are overridden by a compartment enable signal received by the read-only register;

wherein the cache compartment pattern represents an organization of storage elements into the plurality of storage compartments each having a different size.

14. The computer system of claim 13 wherein the one or more cache compartment signals indicate an organization of ways in the cache memory into the plurality of storage compartments.

15. A method comprising:

executing one or more processor instructions that indicate a cache compartment pattern, wherein executing one or more processor instructions includes providing a store instruction to a read-only data storage element that indicates a store operation and detecting the store instruction;

selecting a least recently used way in one of a plurality of storage compartments to store data after a cache miss based on the instructions; and storing data after a cache miss in the least recently used way in one of the plurality of storage compartments in a cache memory based on the cache compartment pattern, wherein the store operation is overridden by a compartment enable signal received at the read-only data storage element;

wherein the cache compartment pattern represents an organization of storage elements into the plurality of storage compartments each having a different size.

16. The method of claim 15 wherein providing a store instruction includes fetching an operand indicated by the store instruction, the operand indicating the cache compartment pattern.

17. The method of claim 15 wherein executing one or more processor instructions that indicate a cache compartment pattern includes executing one or more processor instructions that indicate an organization of the plurality of compartments in the cache memory.

18. The method of claim 17 wherein executing one or more processor instructions that indicate an organization of the plurality of compartments includes executing one or more processor instructions that allocate one or more ways in the cache memory to each one of the plurality of compartments.

19. A computer-readable medium having a first sequence of instructions stored thereon which, when executed by a processor, causes the processor to perform:

executing one or more processor instructions that indicate a cache compartment pattern, wherein a write operation is provided to a read-only storage element within the processor and that the write operation is detected by the processor;

selecting a least recently used way of one of a plurality of storage compartments to store data after a cache miss based on the instructions;

generating cache compartment signals based on the cache compartment pattern, the cache compartment signals indicating one of a plurality of storage compartment in a cache memory in which data is to be stored; and storing data in the least recently used way after the cache miss, wherein the write operation in overridden by a compartment enable signal;

wherein the cache compartment pattern represents an organization of storage elements into the plurality of storage compartments each having a different size.

* * * * *

UNITED STATES PATENT AND TRADEMARK OFFICE
CERTIFICATE OF CORRECTION

PATENT NO. : 6,434,671 B2  
DATED : August 13, 2002  
INVENTOR(S) : Chung

It is certified that error appears in the above-identified patent and that said Letters Patent is hereby corrected as shown below:

Column 10,
Line 59, delete "B(hex)", insert -- 0B(hex) --.

Signed and Sealed this

Eleventh Day of February, 2003

JAMES E. ROGAN
*Director of the United States Patent and Trademark Office*